United States Patent
Zopf et al.

(10) Patent No.: US 8,996,962 B2
(45) Date of Patent: Mar. 31, 2015

(54) CHASE CODING FOR ERROR CORRECTION OF ENCRYPTED PACKETS WITH PARITY

(71) Applicant: Broadcom Corporation, Irvine, CA (US)

(72) Inventors: Robert W. Zopf, Rancho Santa Margarita, CA (US); Prasanna Desai, Elfin Forest, CA (US); Norbert Grunert, Antibes (FR)

(73) Assignee: Broadcom Corporation, Irvine, CA (US)

( * ) Notice: Subject to any disclaimer, the term of this patent is extended or adjusted under 35 U.S.C. 154(b) by 186 days.

(21) Appl. No.: 13/848,624

(22) Filed: Mar. 21, 2013

(65) Prior Publication Data

US 2014/0059407 A1 Feb. 27, 2014

Related U.S. Application Data

(60) Provisional application No. 61/692,679, filed on Aug. 23, 2012, provisional application No. 61/774,062, filed on Mar. 7, 2013.

(51) Int. Cl.

| | |
|---|---|
| *H03M 13/00* | (2006.01) |
| *H03M 13/05* | (2006.01) |
| *H03M 13/45* | (2006.01) |
| *H04L 9/06* | (2006.01) |
| *H03M 13/09* | (2006.01) |
| *H03M 13/11* | (2006.01) |
| *H03M 13/15* | (2006.01) |
| *H03M 13/23* | (2006.01) |
| *H03M 13/29* | (2006.01) |

(52) U.S. Cl.
CPC .............. *H03M 13/05* (2013.01); *H03M 13/09* (2013.01); *H03M 13/1102* (2013.01); *H03M 13/1515* (2013.01); *H03M 13/152* (2013.01); *H03M 13/23* (2013.01); *H03M 13/2957* (2013.01); *H03M 13/453* (2013.01); *H03M 13/63* (2013.01); *H04L 9/0656* (2013.01); H04L 2209/34 (2013.01)

USPC ........................... 714/776; 714/774; 714/793

(58) Field of Classification Search
CPC . H03M 13/05; H03M 13/09; H03M 13/1102; H03M 13/1515; H03M 13/152
USPC ............. 380/270; 386/95; 348/614; 713/160; 714/751, 776, 774, 793
See application file for complete search history.

(56) References Cited

U.S. PATENT DOCUMENTS

| | | | | |
|---|---|---|---|---|
| 6,122,015 | A | * | 9/2000 | Al-Dhahir et al. ............ 348/614 |
| 6,134,694 | A | * | 10/2000 | Uebayashi et al. ........... 714/751 |
| 2004/0083360 | A1 | * | 4/2004 | Walsh et al. .................. 713/160 |
| 2008/0317436 | A1 | * | 12/2008 | Sasamoto et al. ............... 386/95 |
| 2009/0196421 | A1 | * | 8/2009 | Okuda .......................... 380/270 |

* cited by examiner

*Primary Examiner* — David Ton
(74) *Attorney, Agent, or Firm* — Garlick & Markison; Bruce E. Stuckman

(57) ABSTRACT

A plurality of encrypted packets having common payload data are received, wherein each of the plurality of encrypted packets includes a corresponding parity check field, and wherein a corresponding parity check syndrome for each of the plurality of encrypted packets indicates at least one bit error. A payload portion of each of the plurality of encrypted packets is decrypted to generate a plurality of decrypted payload portions. At least one chase coding technique is used to generate a corrected decrypted payload, based on at least one candidate bit error position and further based on the corresponding parity check syndrome for at least one of the plurality of encrypted packets.

20 Claims, 9 Drawing Sheets

CHASE CODING FOR ERROR CORRECTION OF ENCRYPTED PACKETS WITH PARITY

CROSS REFERENCE TO RELATED PATENTS/PATENT APPLICATIONS

The present application claims priority under 35 USC 119 to the following U.S. Utility Patent Application, the contents of which are hereby incorporated herein by reference in its entirety and made part of the present Patent Application for all purposes:

U.S. Provisional Application Ser. No. 61/692,679, entitled "ERROR CORRECTION USING CYCLIC REDUNDANCY CHECK (CRC) ADAPTIVE TO ADVANCED ENCRYPTION STANDARD (AES) ENCRYPTION," filed Aug. 23, 2012;

U.S. Provisional Application Ser. No. 61/774,062, entitled "CHASE CODING FOR ERROR CORRECTION OF ENCRYPTED PACKETS WITH PARITY," filed Mar. 7, 2013.

BACKGROUND OF THE INVENTION

1. Technical Field of the Invention

The invention relates generally to communication systems; and, more particularly, it relates to encrypted communication systems that operate using parity check with redundant transmissions.

2. Description of Related Art

Data communication systems have been under continual development for many years. One such type of communication system that has been of significant interest lately is a communication system that employs iterative error correction codes (ECCs) that operate in accordance with forward error correction (FEC). There are a variety of types of ECCs that may be employed in accordance with various communication systems (e.g., that seek to transmit information from one end of a communication link to another). Communications systems with iterative ECCs are often able to achieve lower bit error rates (BER) (or block error rate (BLER) in the context of block codes) than alternative codes for a given signal to noise ratio (SNR).

A continual and primary directive in this area of development has been to try continually to lower the SNR required to achieve a given BER (or BLER) within a communication system. The ideal goal has been to try to reach Shannon's limit in a communication channel. Generally, Shannon's limit may be viewed as being the data rate to be used in a communication channel having a particular SNR that achieves error free transmission through the communication channel. In other words, the Shannon limit is the theoretical bound for channel capacity for a given modulation and code rate. The disadvantages of conventional approaches will be evident to one skilled in the art when presented the disclosure that follows.

DETAILED DESCRIPTION OF THE INVENTION

Figure 1:
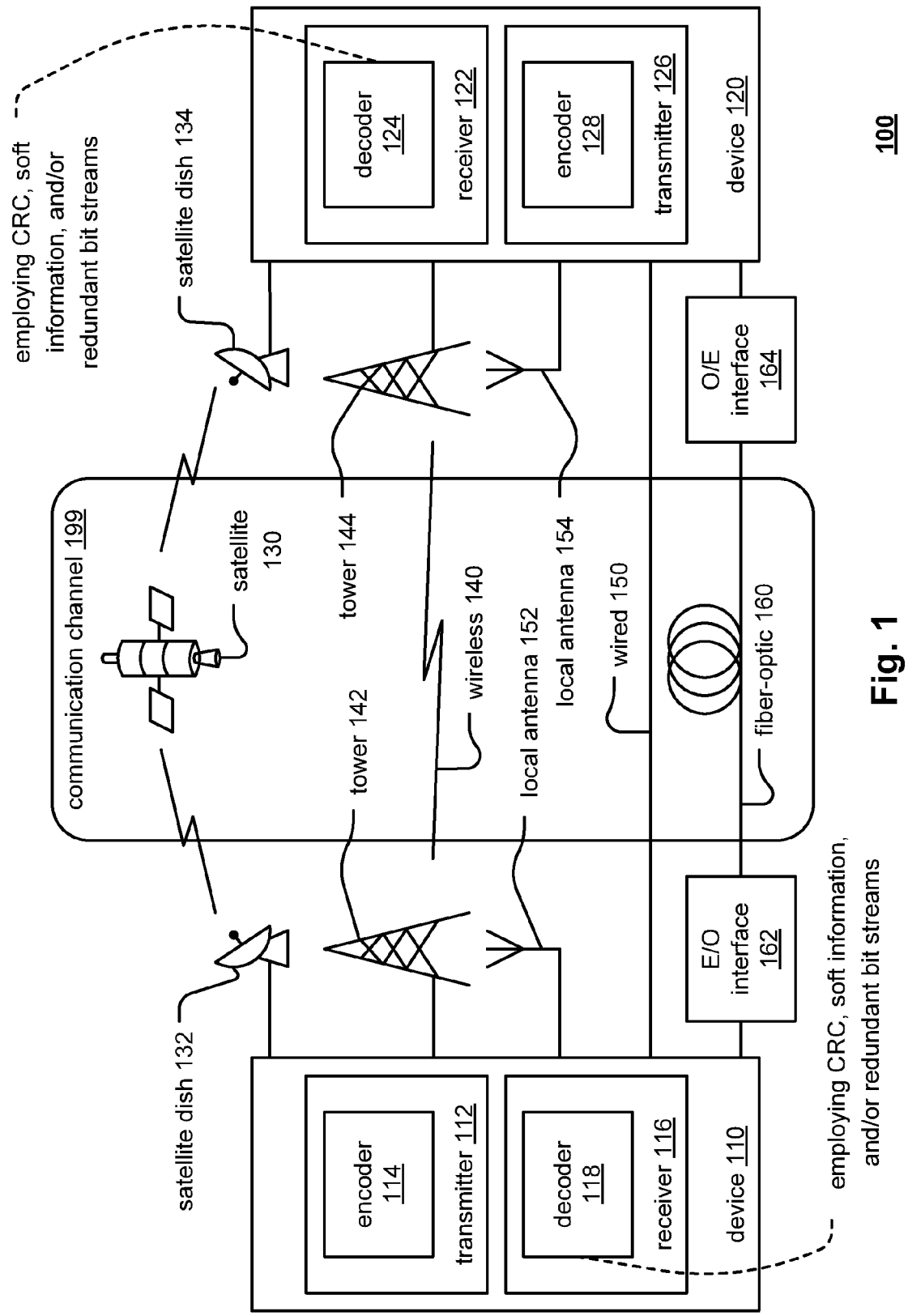
FIG. 1 and FIG. 2 illustrate various embodiments of communication systems.
Figure 2:
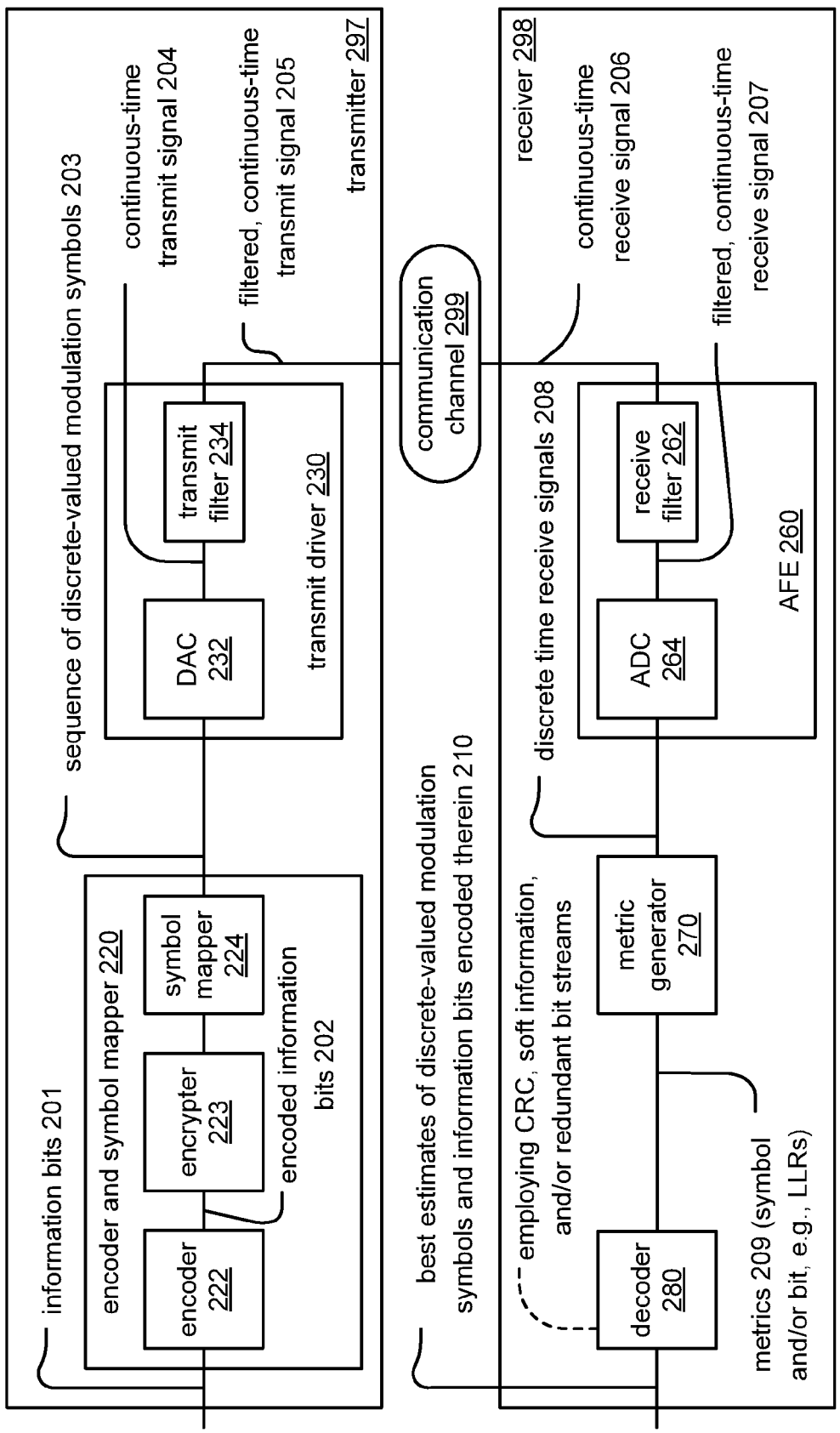

FIG. 1 and FIG. 2 illustrate various embodiments of communication systems, 100 and 200, respectively. Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 122 having an encoder 128 and including a receiver 122 having a decoder 124) at the other end of the communication channel 199. The respective receivers 116 and 126, including their respective decoders 118 and 124 therein, are operative to employ cyclic redundancy check (CRC), soft information (e.g., such as associated with a given, singular bit stream), and/or redundant bit streams when processing received signals in accordance with the various aspects presented herein. Further, encryption is employed by the transmitters 112 and 126 to encrypt the signals sent via the communication channels 199 and the decoders 118 and 124 operate based on decrypted data. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

It is noted that such communication devices 110 and/or 120 may be stationary or mobile without departing from the scope and spirit of the invention. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120. Any of the various types of coding described herein can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

FIG. 2 presents a communication system 200 that provides a more detailed example of the operation of a particular transmitter/receiver pair (112/122 or 116/126) as presented in conjunction with FIG. 1 Referring to the communication system 200 of FIG. 2, at a transmitting end of a communication channel 299, information bits 201 are provided to a transmitter 297 that is operable to perform encoding and encrypting of these information bits 201 using an encoder and symbol mapper 220 (which may be viewed as being distinct functional blocks as encoder 222 that generates encoded information bits 202, encrypter 223 and symbol mapper 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. The transmit driver 230 may perform any necessary front end processing of a signal received from a communication channel (e.g., including any one or digital to analog conversion, gain adjustment, filtering, frequency conversion, etc.) to generate the filtered, continuous-time transmit signal 205.

At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). The AFE 260 may perform any necessary front end processing of a signal received from a communication channel (e.g., including any one or analog to digital conversion, gain adjustment, filtering, frequency conversion, etc.) to generate a digital signal provided to a metric generator 270 that generates a plurality of metrics corresponding to a particular bit or symbol extracted from the received signal. The metric generator 270 calculates metrics 209 (e.g., on either a symbol and/or bit basis) that are employed by a decoder 280 to make best estimates of the discrete-valued modulation symbols and information bits encoded therein 210 in order to recover as closely as possible the information bits 201. As within other embodiments presented herein, the receiver 298, including the respective decoder 280 therein, is operative to employ decryption, and further CRC, soft information (e.g., such as associated with a given, singular bit stream), and/or redundant bit streams when processing received signals in accordance with the various aspects presented herein. As the reader may understand, such soft information may be employed within embodiments employing redundant bit streams for providing even improved confidence in the location(s) of most likely (or potential) bit error locations.

The decoders of any of the various embodiments presented herein may be implemented to include various aspects and/or embodiments of the invention therein. In addition, several of the following Figures describe other and particular embodiments (some in more detail) that may be used to support the devices, systems, functionality and/or methods that may be implemented in accordance with certain aspects and/or embodiments of the invention. It is noted that the transmitter 297 and the receiver 298, and/or individual blocks therein, may include more or fewer components, modules, circuitries, etc. than as depicted in the diagram in alternative embodiments without departing from the scope and spirit of the invention. It is also noted that various types of error correction codes (ECCs) may be employed herein. For example, any one or more of any type or variant of a convolutional code, a Reed-Solomon (RS) code, a turbo code, a turbo trellis code modulation (TTCM) code, a low density parity check (LDPC) code, a BCH (Bose and Ray-Chaudhuri, and Hocquenghem) code, and/or any other type of ECC as well, etc. Moreover, as will be seen in various embodiments herein, more than one ECC and/or more than one type of ECC may be employed when generating a single encoded signal in accordance with the principles presented herein. For example, certain of the embodiments presented herein operate as product codes, in which an ECC is employed more than once or more than one type of ECC is employed (e.g., a first ECC during a first time and a second ECC at a second time) to generate an encoded signal.

Moreover, it is noted that both systematic encoding and non-systematic encoding may be performed in accordance with the various principles presented herein. Systematic encoding preserves the information bits being encoded and generates corresponding redundancy/parity bits (i.e., redundancy and parity may be used interchangeably herein); for example, the information bits being encoded are explicitly shown/represented in the output of non-systematic encoding. Non-systematic encoding does not necessarily preserve the information bits being encoded and generates coded bits that inherently include redundancy parity information therein; for example, the information bits being encoded need not be explicitly shown/represented in the output of non-systematic encoding. While many of the embodiments shown herein refer to systematic encoding, it is noted that non-systematic encoding may alternatively, be performed in any embodiment without departing from the scope and spirit of the invention.

The present invention employs a novel approach for performing error detection and correction for use in communication systems that operate using encrypted data payloads and parity check, such as a cyclic redundancy check (CRC), Bose Chaudhuri Hocquenghem (BCH) code or other parity check scheme. In particular chase coding techniques are employed to process one or more transmissions (e.g., an original transmission and possibly one or more redundant transmissions) sent from the transmitter 297 to the receiver 298 to recover the information bits 201. In operation, the receiver 298 receives a plurality of encrypted packets having common payload data such as an original transmission and one or more redundant retransmissions of the same information bits 201. Each of the plurality of encrypted packets includes a corresponding parity check field. The original transmission and each of the redundant retransmissions have generated a corresponding parity check syndrome that indicates at least one bit error. In this case, further processing is required to recover the correct information bits 201 from these redundant transmissions.

The decoder 280 is implemented via a processing circuit coupled to decrypt a payload portion of each of the plurality of encrypted packets to generate a plurality of decrypted payload portions. The decoder 280 applies at least one chase coding technique to generate a corrected decrypted payload, based on a plurality of candidate bit error positions and further based on the corresponding parity check syndrome for at least one of the plurality of encrypted packets.

In an embodiment, the decoder 280 employs one or more chase coding techniques to compare the plurality of decrypted payload portions to generate the plurality of candidate bit error positions. In this mode of operation, properties associated with at least two transmissions (e.g., including at least one redundant transmission) can include comparisons and/or processing of those at least two transmissions including performing XOR processing comparison of the decrypted payloads, majority decision or other processing to identify bit error positions in the decrypted payloads. In other instances, a chase coding technique can employ as few as a single transmission. In particular, properties associated with bit and/or symbol positions can be used to identify the plurality of candidate bit error positions. For example, such properties associated with a transmission can include metrics, soft information, confidence levels (e.g., as associated with Viterbi detection or decoding), or other symbol reliability data can be employed to aid in the process of determining the locations of bit errors for the purpose of correction.

In furtherance of the embodiments above, once the plurality of candidate bit error positions have been identified, the chase coding techniques can be employed to calculate a parity check syndrome corresponding to each of the plurality of candidate bit error positions, compare the parity check syndrome corresponding to the plurality of candidate bit error positions to selected ones of the corresponding parity check syndrome for each of the plurality of encrypted packets and further to selectively correcting a selected one of the plurality of decrypted payload portions when a corresponding selected one of the plurality of parity check syndromes matches the parity check syndrome corresponding to one of the plurality of candidate bit error positions. Further, in circumstances when none of the selected one of the plurality of parity check syndromes matches the parity check syndrome corresponding to any of the plurality of candidate bit error positions, an uncorrectable error condition can be indicated and further retransmissions can be requested or the packet data can be discarded, etc.

The at least one chase coding technique employed by the decoder 280 can include a plurality of different chase coding techniques. These chase coding techniques can be labeled generally as BEC-nC (Bit-Error Correction) where, n is the number of retransmission processed along with the original transmission to decode transmitted information bits 201.

Consider an example of BEC-nC. In this case, the chase coding technique generates the candidate bit error positions based on a comparison of two of the n+1 decrypted payload portions. The decoder 280 operates to compare the differences in the bit pattern of original and re-transmitted packets to identify candidate error positions. The decoder 280 then flips bits in the candidate error positions based on either majority rule decisions or as part of a systematic search algorithm that evaluates a set of possible error combinations and re-calculates the CRC. In this fashion, the decoder 280 evaluates possible potential combinations of bit errors. In a scenario where bits are different in 5 locations, the decoder evaluates $2^5=32$ different bit error combinations. If for any of bit error combinations there was only one for which the CRC passed, this combination is regarded as the true error pattern and the packet is corrected correspondingly.

Consider an example of BEC-2C. In this case, the chase coding technique generates the candidate bit error position based on a comparison of three of the plurality of decrypted payload portions. With three bits for each position, the decoder 280 can perform bit-wise majority decision and checks CRC. If CRC passes, the decoder 280 can correct the bits based on the majority decision. Otherwise the algorithm can operate in a similar fashion to BEC-1C and flip exactly one bit in each location where there was a deviation and then all combinations of exactly two bits. If the CRC passes for exactly one of these combinations then the combination that passes can be viewed as the correct combination.

It should be noted that the decoder 280 can employ combinations of BEC-2C, BEC-1C and BEC-0C to arrive at the best estimate for the information bits 201. It should be noted that, even when data from n retransmissions have been collected, chase coding techniques that rely on less than n transmission can be employed. For example, when n=2 retransmissions have been received, BEC-2C, BEC-1C and BEC-0C can selectively be employed.

An example of operation where multiple chase combining techniques are employed when n=2 is as follows.
 1) Run BEC-2C algorithm based on a majority bit decision for candidate error positions;
 2) If 1) fails, run a BEC-1C algorithm for candidate error positions assuming 1 bit location left after performing BEC-2C;
 3) If 2) fails, run a BEC-1C algorithm for candidate error positions assuming 2 bit locations left after performing BEC-2C;
 4) If 3) fails, run a BEC-0 algorithm on each transmission/retransmission;
 5) If 4) fails, indicate an uncorrectable error.

Consider an additional example where two communication devices may operate via Bluetooth eSCO links, (e.g. where wireless headsets communicate via narrow-band or wide-band voice communications. With the upcoming Bluetooth standard 4.1, eSCO links (as well as others) can be encrypted via the Advanced Encryption Standard (AES). In this case, it is noted that AES encryption will make original and re-transmitted packets look different from each other because the AES nonce continuously changes. In particular, the AES nonce is derived from the Bluetooth clock and thus changes for every packet in eSCO links (even for re-transmissions) so that generally, no two encrypted packets will have the same bit pattern. For BEC-1C and BEC-2C, the bit-wise deviation is built on the decrypted payload. This is effective because AES encryption uses bit-wise XOR'ing of the cleartext with an encryption keystream. A bit error in the encrypted payload results in a bit error in the cleartext payload in exactly the same location. The CRC syndrome is calculated for all combinations of potential errors as before and then compared to the actual CRC syndrome of each of the received packets. Even though the CRC was built on the AES encrypted payload, the CRC syndrome is the same as if the CRC was built on the cleartext payload. If one of the CRC syndromes matches, it is assumed that that packet did not have an error in the payload CRC and the payload is corrected. While this assumes that the CRC has no errors, this assumption can yield effective decoding, because the chase combining techniques only operate in circumstances with relatively few errors in the received data and further, the size of the CRC field is small in comparison to the overall packet size. Also, BEC-0° C. can be applied in circumstances where BEC-2C/BEC-1C techniques fail. In particular, BEC-0° C. can be applied to the decoding of full packets including both the data payload and the CRC field. This can provide correct decoding in some circumstances where the errors are present in the CRC field or fields of the transmission/retransmissions and also when other uncorrectable bit error combinations occur.

Further details regarding the operation of several chase coding techniques, including BEC-2C, BEC-1C and BEC-0° C. techniques along with several optional functions and features, are presented in conjunction with FIGS. 3-9 that follow. While many of the techniques described in the methods that follow operate on an entire packet of data including both the data payload and the parity check field—these techniques, in the case of BEC-1C and/or BEC-2C, can be applied instead to the decrypted payload of the packet as described above, assuming that the CRC portion has no errors.

Figure 3:
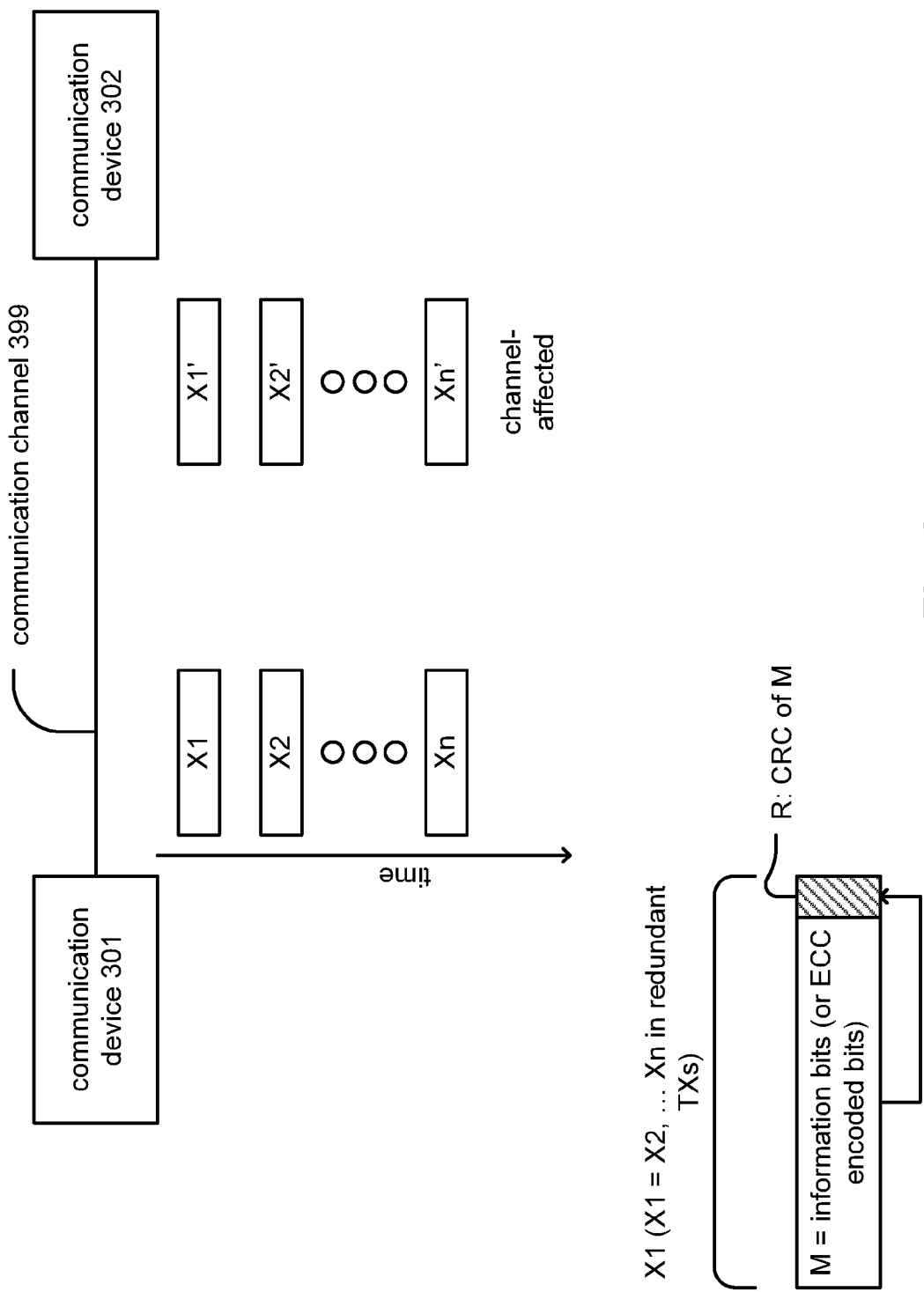
FIG. 3 illustrates an embodiment of a communication system operating in accordance with redundant transmissions.

FIG. 3 illustrates an embodiment of a communication system 300 operating in accordance with redundant transmissions. A communication device 301 and a communication device 302 are implemented for communications there between via a communication channel 399. Within this embodiment, as within others, the communication channel 399 itself may be of any type of communication channel (e.g., magnetic media, wired, wireless, fiber, copper, and other types of media or any combination thereof as well). The communication device 301 sends more than one transmission to the communication device 302 via the communication channel 399. Each respective transmission may be affected differently by the communication channel 399. For example, the transmission X1 as sent by the communication device 301 may arrive as being a communication channel modified signal X1'. Analogously, the transmission X2 as sent by the communication device 301 may arrive as being a communication channel modified signal X2', and so on up to the transmission Xn as sent by the communication device 301 that may arrive as being a communication channel modified signal Xn'. In an embodiment that employs multiple redundant transmissions, the various transmissions X1, X2, and up to Xn may be the very same as sent by the communication device 301 (e.g., identical streams before being launched into the communication channel 399). However, as each respective transmission may be affected differently by the communication channel 399 (e.g., because the communication channel may be dynamic, in that, its characteristics are change as a function of time), although each respective is identical before being launched into the communication channel from the communication device 301, each may be different when arriving at the communication device 302 due to bit errors introduced by the communication channel.

In accordance with cyclic redundancy check (CRC), a number of information bits, shown as M, and alternatively, referred to as a message (the bits M may themselves be error correction code (ECC) encoded bits in some embodiments) is appended by one or more CRC bits, R, that are calculated based on the content of the information bits, M. Of course, while this embodiment shows the CRC bits being placed at the end of the frame or packet, it is noted that the CRC bits may be placed in different locations as opposed to at the end of the information bits, M, without departing from the scope and spirit of the invention. A brief review of CRC is presented below for the convenience of the reader.

Generally, CRC is based on division in the ring of polynomials over the finite field GF(2) (the integers modulo 2 finite field, where GF represents Galois Field), that is, the set of polynomials where each coefficient is either zero or one, and arithmetic operations wrap around (due to the nature of binary arithmetic). Any string of bits can be interpreted as the coefficients of a message polynomial of this sort, and to find the CRC, the message polynomial is multiplied by xn and then the remainder is found when dividing by the degree-n generator polynomial. The coefficients of the remainder polynomial are the bits of the CRC.

This may be represented, in general form, as follows:

$$M(x) \cdot x^n = Q(x) \cdot G(x) + R(x), \quad (1)$$

where $M(x)$ is the original message polynomial and $G(x)$ is the degree-n generator polynomial. The bits of $M(x) \cdot x^n$ are the original message with n zeros added at the end. The CRC 'checksum' is formed by the coefficients of the remainder polynomial $R(x)$ whose degree is strictly less than n. The quotient polynomial $Q(x)$ is of no interest in most embodiments.

In communication, a sending communication device (e.g., communication device 301) attaches the n bits of R after the original message bits of M, sending the following:

$$D_S(x) = M(x) \cdot x^n - R(x). \quad (2)$$

The receiving communication device (e.g., communication device 302), knowing $G(x)$ and therefore n, separates M from R and repeats the calculation, comparing the computed remainder to the received one. If they are equal, then the receiving communication device assumes the received message bits are correct (e.g., that the bits within the message, M, are correct). Alternatively, the receiving communication device can compute the remainder for the complete message. However, because of any deleterious effects incurred by the communication channel 399, the received message may have been corrupted by bit-errors as shown below:

$$D_R(x) = D_S(x) + E(x) \quad (3)$$

The receiving communication device then computes $$R_R(x) = REM\{D_R(x)/G(x)\} \quad (4)$$

where REM{•} is the remainder.

Alternatively, if there are no bit-errors, then $D_R(x) = D_S(x)$ and $$\begin{aligned} R_R(x) &= REM\{D_s(x)/G(x)\} \quad (5) \\ &= REM\left\{\frac{M(x) \cdot x^n - R(x)}{G(x)}\right\} \\ &= REM\left\{\frac{Q(x) \cdot G(x) + R(x) - R(x)}{G(x)}\right\} \\ &= REM\{Q(x)\} \\ &= 0 \end{aligned}$$

Hence, if the remainder is zero, the receiving communication device assumes the received message bits are correct (e.g., no errors were incurred within the message during its transmission via the communication channel 399).

It is again noted that the errors incurred during receipt at a receiving communication device 302, from the communication channel 399, may also be corrected (and not merely identified) using various aspects of the invention presented herein. For example, assuming a signal sequence was transmitted properly and without incurring any error during transmission via the communication channel 399, but assuming some error was incurred during receipt or preliminary processing at or within the receiving communication device 302 (e.g., during demodulation, digital sampling, etc.), those errors may also be not only detected, but corrected, using the various aspects of the invention presented herein.

With respect to the checksum that is calculated in accordance with CRC, errors incurred during transmission via the communication channel and specifically to particular bits within a transmitted signal sequence may be discriminated by at least one syndrome calculated in accordance with the CRC for each of the respective bits of the received signal sequence.

For example, if errors occur during transmission of a signal sequence, then $D_R(x) \neq D_S(x)$ and $$D_R(x) = D_S(x) + E(x) \quad (6)$$

where $E(x)$ is the error polynomial. From the above equations, it follows that:

$$R_R(x) = REM\{E(x)/G(x)\} \quad (7)$$

The error polynomial can be written as:

$$E(x) = \sum_{k=1}^{K} C_k \cdot x^k \quad (8)$$

where $C_k=1$ if there is a bit-error in the $k^{th}$ bit of the message, and $C_k=0$ otherwise. The remainder can then be rewritten as follows:

$$R_R(x) = REM\left\{\frac{\sum_{k=1}^{K} C_k \cdot x^k}{G(x)}\right\} \quad (9)$$

$$= REM\left\{\frac{C_1 \cdot x}{G(x)}\right\} + REM\left\{\frac{C_2 \cdot x^2}{G(x)}\right\} + \ldots + REM\left\{\frac{C_K \cdot x^K}{G(x)}\right\}$$

$$= C_1 \cdot S_1 + C_2 \cdot S_2 + \ldots + C_K \cdot S_K$$

and $$S_k = REM\{x^k / G(x)\} \quad (10)$$

is the syndrome produced by an error in the $k^{th}$ bit position in the K bit length received stream. As may be seen, respective syndromes may be calculated for errors (e.g., single bit errors) located in the various respective locations within various signal sequences. Such predetermined, pre-computed, pre-calculated syndrome information associated with single bit errors within each possible location within may be stored in memory for use in real time accessing and use in calculating any desired linear combination of syndromes to generate one or more permutation syndromes that satisfy or correspond to the identified error locations within at least one of the received bit streams. Moreover, efficiency of searching through and calculating such syndrome combinations may be made using properties of Gray Coding in the syndrome calculation operations. For example, in accordance with such Gray Coding, the combination or addition of two respective Gray Coded values can generate a third Gray Coded value. The use of such Gray Code properties can provide significant efficiency and speed by which such syndrome combinations may be made in accordance with such error detection and correction.

An important reason for the desirability of CRC for detecting the accidental alteration of data is the associated efficiency guarantee. Typically, an n-bit CRC, applied to a data block of arbitrary length, will detect any single error burst not longer than n bits, and will detect a fraction $1-2^{-n}$ of all longer error bursts. In addition to burst errors, the use of CRC may also be applicable for detection of isolated bit-errors. A Hamming weight N is the number of errors, out of all possible message corruptions, that may go undetected by a CRC using a particular polynomial. A set of Hamming weights captures the performance for different numbers of bits corrupted in a message at a particular data word length, with each successively longer data word length having set of Hamming weights with higher values. The first non-zero Hamming weight determines a code's Hamming Distance (HD). Most of the popular CRCs can also detect all errors with an odd number of bits by choosing G(x) with an even number of terms.

Figure 4:
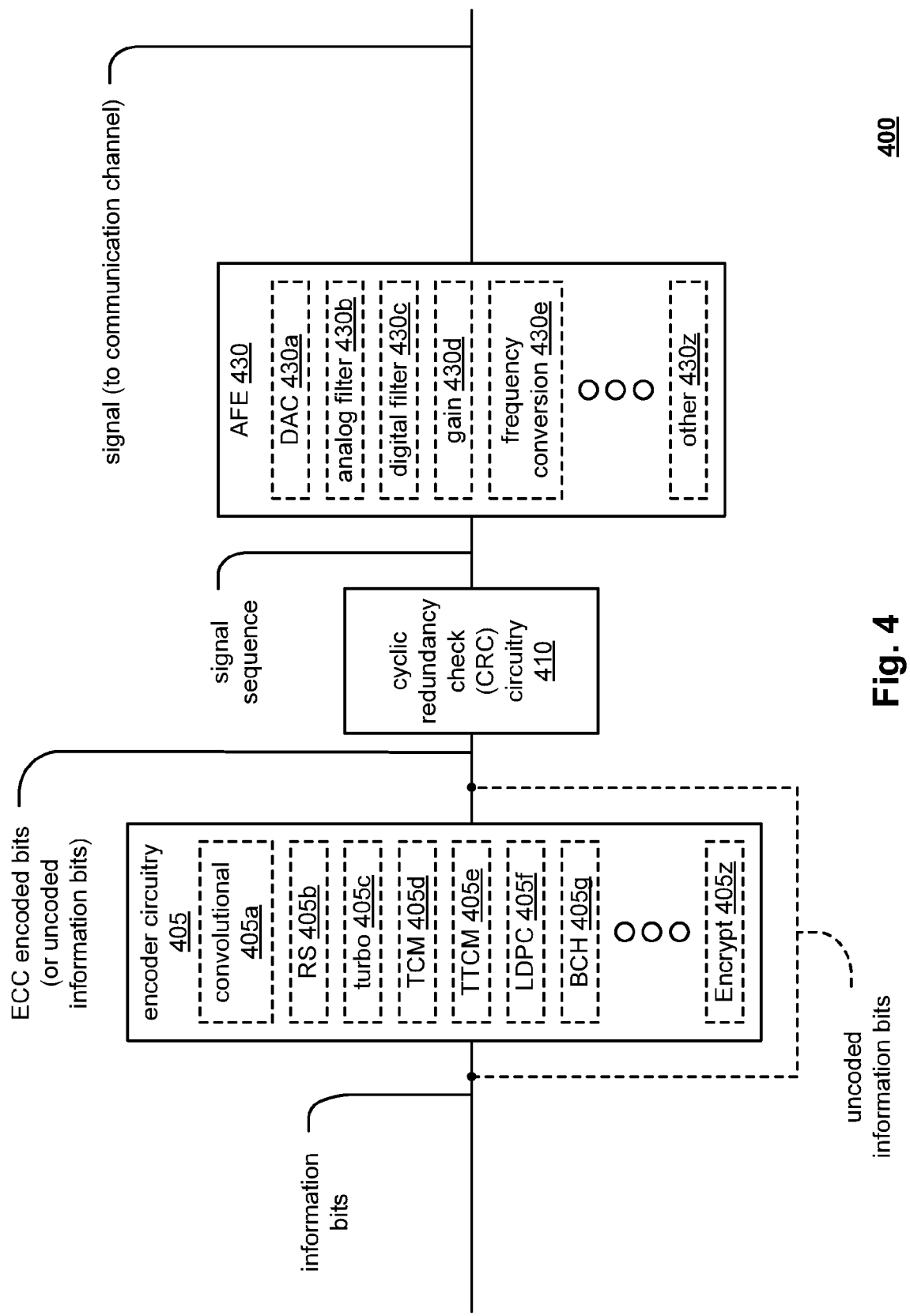
FIG. 4 illustrates an embodiment of a communication device operative to perform transmission of a signal.

FIG. 4 illustrates an embodiment of a communication device 400 operative to perform transmission of a signal. Information bits (e.g., again, which may generally be any type of information bits corresponding to data, video, speech, audio, etc. any of which may generally be referred to as 'data') are processed by the communication device 400. The information bits are provided to an encoder circuitry 405 that processes the information bits and generates error correction code (ECC) encoded bits there from. In embodiments that do not include or do not perform ECC encoding, uncoded information bits may be viewed as bypassing ECC encoding (e.g., bypassing an encoder circuitry 405 as shown in this embodiment), and then undergoing subsequent processing appropriate to generate a signal that may be transmitted via the communication channel.

When ECC is employed in a given embodiment, any desired type of ECC (or any combination thereof) may be employed by the encoder circuitry 405, including a convolutional code 405a, a Reed-Solomon (RS) code 405b, a turbo code 405c, a trellis coded modulation (TCM) code 405d, a turbo trellis coded modulation (TTCM) code 405e, a low density parity check (LDPC) code 405f, or a BCH (Bose and Ray-Chaudhuri, and Hocquenghem) code 405g, any combination thereof, and/or any other type of ECC as generally as well as encryption as shown by block 405z.

These information bits (that may themselves have undergone ECC encoding and encryption via AES) are then provided to a cyclic redundancy check (CRC) circuitry 410 that is operative to process the information bits and calculated one or more CRC bits based thereon. The output from the CRC circuitry 410 may generally be referred to as a signal sequence. This signal sequence is provided to an analog front end (AFE) 430 that is operative to perform any necessary processing to generate a signal that comports appropriately with a communication channel. For example, the AFE 430 may include any number of components therein (or perform any number of operations using such components). The AFE 430 may include a digital to analog converter (DAC) 430a, an analog filter 430b, a digital filter 430c, a gain module 430d, a frequency conversion module 430e, and/or any other circuitry, such as an encrypter or other circuitry or module, etc. The AFE 430 may perform any necessary front end processing of a signal to be launched into and transmitted via a communication channel (e.g., including any one or more of digital to analog conversion, gain adjustment, filtering, frequency conversion, etc.) to generate a signal that appropriately comports with the communication channel and that may be transmitted thereby.

Figure 5:
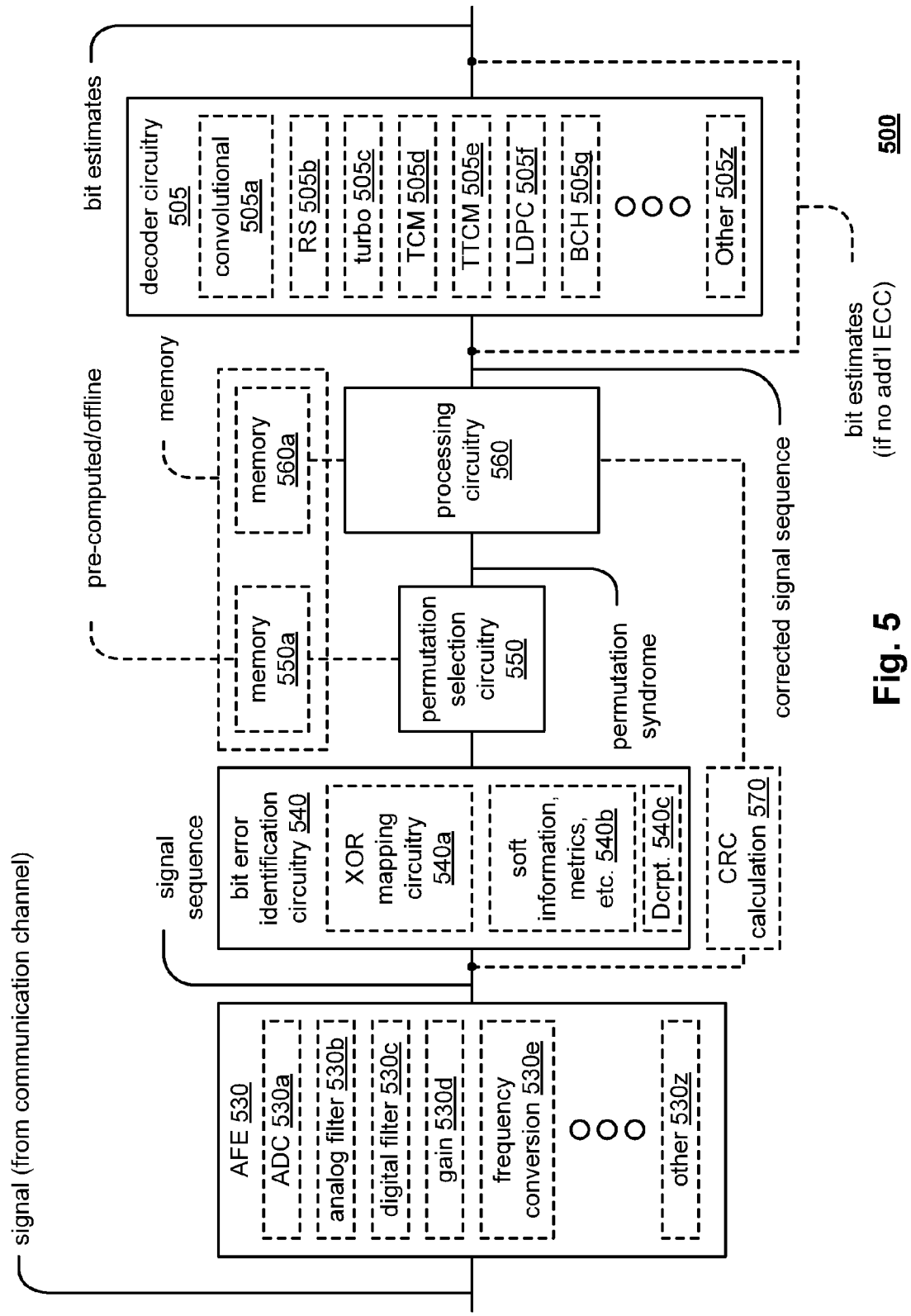
FIG. 5 illustrates an embodiment of a communication device operative to perform receipt of a signal.

FIG. 5 illustrates an embodiment of a communication device 500 operative to perform receipt of a signal. A signal, sent from a sending communication device, is received from a communication channel. At a receiving end of the communication channel, a signal is provided to an AFE 530 that may perform any necessary front end processing of a signal that is received from a communication channel (e.g., including any one or more of analog to digital conversion, gain adjustment, filtering, frequency conversion, etc.) to generate a signal sequence that may be processed in accordance with the various aspects of error correction presented herein. For example, the AFE 530 may include any number of components therein (or perform any number of operations using such components). The AFE 530 may include an analog to digital converter (ADC) 530a, an analog filter 530b, a digital filter 530c, a gain module 530d, a frequency conversion module 530e, and/or any other circuitry such as a decrypter or other circuitry or module 530z, etc. In certain embodiments and from certain perspectives, the signal sequence output from the AFE 530 is a baseband signal (e.g., a digital signal typically provided at a frequency corresponding to a clock frequency of the communication device 500 or an integer or sub-multiple of the clock frequency).

This signal sequence is then passed to a bit error identification circuitry 540 that is operative to identify, by processing bits and/or symbols of a signal sequence, error locations therein. There are a variety of means by which such bit error identification may be performed including employing at least two signal sequences and performing XOR processing of them to identify the bit locations in which such two signal sequences differ (e.g., where the bits in the same, respective location in two signal sequences are the same, the XOR result will be 0; alternatively, where the bits in the same, respective location in two signal sequences are different, the XOR result will be 1), as shown in a block 540a. Alternatively, such bit error identification may be performed using soft information, metrics, etc. as may be calculated on respective symbols and/or bits of a signal sequence, as shown in a block 540b. In this alternative embodiment, a singular signal sequence may undergo processing (e.g., using soft information, metrics, etc.) to identify the most likely (or potential) error locations therein, and a redundant signal sequence is not needed. Bit error identification circuitry 540 further includes a decryption block 540c that selectively produces decrypted data payloads for operation of chase coding algorithms BEC-1C/BEC2C as discussed in conjunction with FIGS. 1 and 2 and further provides decryption generally for correctly received packets—i.e. those that are received without CRC errors.

In addition, the received signal sequence may undergo CRC processing, such as using block 570, to determine if the CRC passes (e.g., if the CRC check provides a non-zero). Based on such a CRC triggering event, a subsequent transmission (e.g., a redundant transmission) may be requested from a transmitting communication device. The results of this CRC check may also be provided to a processing circuitry 560.

Once information is determined in regards to the most likely (or potential) error locations within the received signal sequence, using any desired manner or combination thereof, this information is passed to a permutation selection circuitry 550 that is operative to determine at least one permutation syndrome (e.g., a singular syndrome, a linear combination of syndromes, etc.) that corresponds to the calculated CRC remainder of the signal sequence (e.g., CRC remainder being non-zero). Syndromes associated with single bit-errors for each of the respective bit locations within a signal sequence may be calculated 'a priori' or off-line (e.g., generally speaking, not in real time but some time beforehand). Then, these predetermined values may be employed in real time to calculate any appropriate, possible combinations that may satisfy the constraints of the results of this CRC check. There may be situations in which more than one permutation syndrome satisfies the results of this CRC check.

Once one or more candidate permutation syndromes are determined, the processing circuitry 560 is operative to generate a corrected signal sequence using the received signal sequence, a redundant signal sequence, and/or a combination thereof. The corrected signal sequence may be provided to a decoder circuitry 505 that may perform ECC decoding thereon in accordance with the appropriate ECC used at the transmitter end of the communication channel (e.g., in a transmitting communication device). That is to say, this corrected signal sequence is then provided to a decoder circuitry 505 that is operative to make best estimates of information bits encoded therein.

In alternative embodiments in which the signal sequence does not correspond to any ECC encoding (e.g., uncoded modulation), the output from the processing circuitry 560 includes the best estimates of the information bits. Such an embodiment may be viewed as bypassing the decoder circuitry 505. With respect to the decoder circuitry 505, any desired type of ECC (or any combination thereof) may be employed by the decoder circuitry 505, including a convolutional code 505a, a Reed-Solomon (RS) code 505b, a turbo code 505c, a trellis coded modulation (TCM) code 505d, a turbo trellis coded modulation (TTCM) code 505e, a low density parity check (LDPC) code 505f, or a BCH (Bose and Ray-Chaudhuri, and Hocquenghem) code 505g, and/or any other type of ECC as generally shown by block 505z.

In accordance with performing error correction based on CRC, one approach involves performing bit flipping of the corresponding bits of the received signal sequence that are in the identified bit-error locations. For example, considering an embodiment in which there is a single bit-error in the received signal sequence or data stream, $D_R(x)$, then at the receiving communication device, the remainder as calculated in accordance with CRC will be non-zero. The receiving communication device could successively flip one-bit at a time and correspondingly re-compute the remainder for each of the possible modified signal sequences. For a given, potential corrected signal sequence, if the current bit position does not contain the original or actual bit-error, then the new stream (i.e., the potential corrected signal sequence) will then contain two errors (as opposed to a single bit-error). As long as the Hamming distance (HD) is greater than 2 (i.e., HD>2), then the remainder will be non-zero. However, if the current bit position does contain the actual error, then the received signal sequence of stream will equal the original stream and the remainder will be zero. In such an instance, the bit-error location is then known and the bit-error can be corrected.

Generally speaking, the received signal sequence may be viewed as containing P errors. However, the receiving communication device only knows that the remainder is non-zero which indicates only that there is at least one bit-error. No indication is given for the number of bit-errors present. The above described brute-force bit-flipping approach will correct the bit-errors if the following is true:

$$2 \cdot P < HD. \tag{11}$$

To understand this relationship, consider that to correct P bit-errors, P bits must be flipped. Since the location of the errors is not known, it is possible to flip P correct bits, thus creating a stream with $2 \cdot P$ errors. If $2 \cdot P$ is equal or greater than HD, then the power of the CRC is exceeded, and the error stream with $2 \cdot P$ errors may generate a zero remainder. In practice, P is not known at the receiving communication device, and hence, any bit flipping may result in erroneously passing the CRC if $P \geq HD-1$.

It is noted that is a practical limitation to the above-described bit flipping approach. The number of times the CRC must be computed grows exponentially with the number of bit-errors present (and hence the number of bit-flips that must occur exhaustively to cover all of the possibilities). For example, consider P errors in a K-bit stream. There are $$\binom{K}{P} = \frac{K!}{P!(K-P)!} \tag{12}$$

combinations to consider. Considering a concrete example, if K=100 bits, and P=3, there are 161,700 bit-error permutations. Note that for even such a relatively small block size, a significantly large number of calculations must necessarily be made. Such a large number of CRC related calculations may not be desirable in certain applications (e.g., in terms of processing time constraints, desired latency, etc.).

However, because of the properties of the math used in computing CRCs, the full CRC computation need not be recomputed each time based on each possible signal sequence. This can be seen from the fact (as described above) that any error $R_R(x)$ may be viewed as being a linear combination of the possible single bit-error syndromes. Therefore, the calculation of the individual we only need to determine the $C_k$'s such that $$R_R(x)=C_1 \cdot S_1+C_2 \cdot S_2+\ldots+C_K \cdot S_K \quad (13)$$

All $$\binom{K}{P}$$

permutations need to be considered, but instead of re-computing the CRC, only n-bit sums need to be computed (n is the order of the CRC). All possible single-bit syndromes are pre-computed (e.g., calculated off-line) according to:

$$S_k(x) = \frac{C_k \cdot x^k}{G(x)} \quad k=1 \ldots K \quad (14)$$

and stored in a memory 550a or 560a (e.g., a table, look up table (LUT)), etc.) and retrieved to solve for $R_R(x)$. These values may then be viewed as being predetermined values against which calculated possible values of a received signal sequence are compared.

Figure 6:
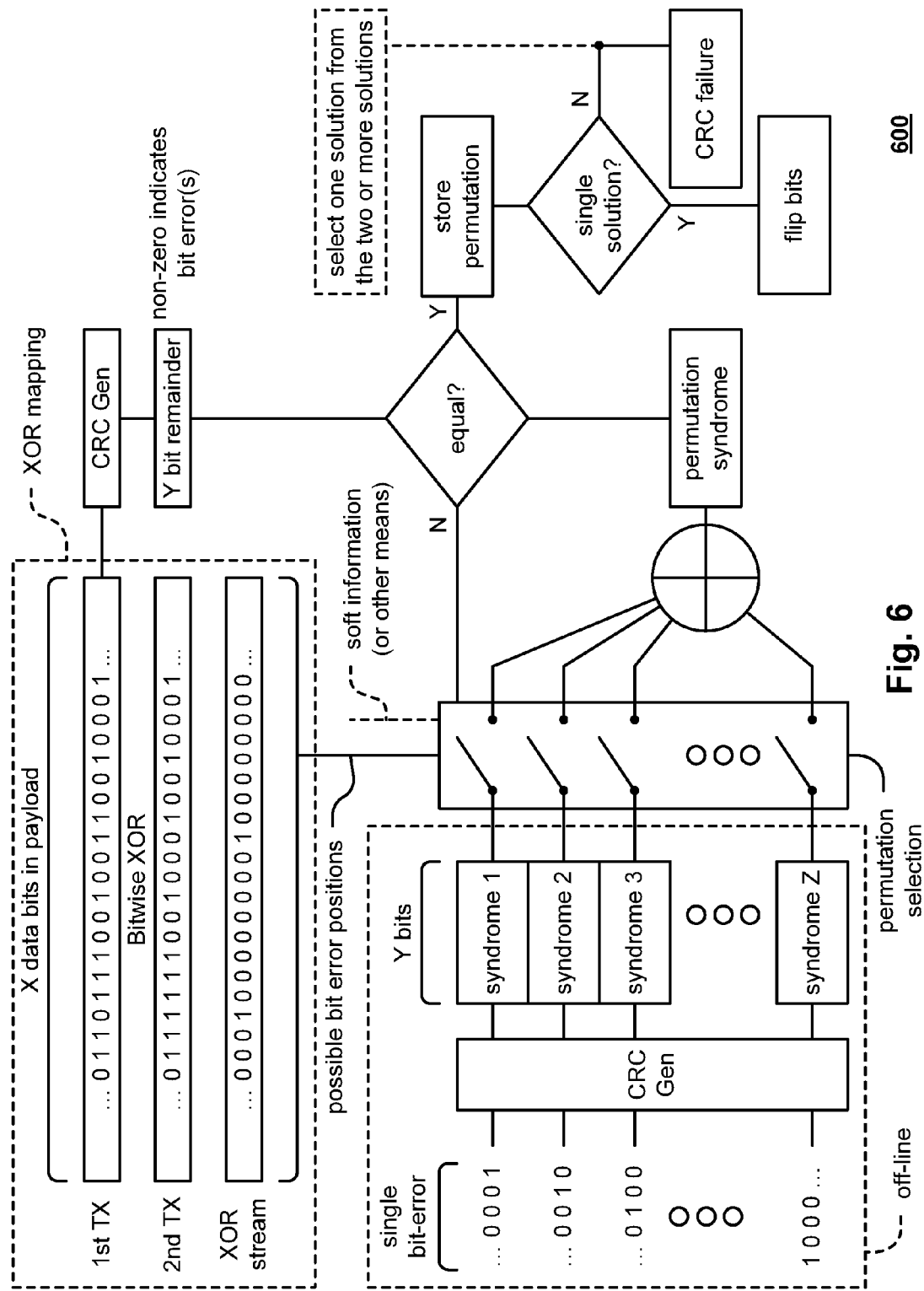
FIG. 6 illustrates an embodiment of an operations and functionality within a cyclic redundancy check (CRC) error correction (EC) decoder.

FIG. 6 illustrates an embodiment of a operations and functionality within a cyclic redundancy check (CRC) error correction (EC) decoder. One embodiment 600 in accordance with a BEC-1C implementation shows the use of two separate signal sequences, the second signal sequence being a re-transmission of the first signal sequence, that undergo XOR processing to identify the locations in which the two signal sequences are different. When undergoing XOR processing, where the bits in the same, respective location in two signal sequences are the same, the XOR result will be 0. Alternatively, where the bits in the same, respective location in two or more signal sequences are different, then the XOR result will be 1. The results of '1' provide indication as to where possible error locations may be in the received signal sequences.

While one embodiment employs XOR processing, it is noted that other means to perform error identification may be performed including a BEC-0 implementation using soft information, metrics, and/or symbol reliability information as may be calculated in accordance with AFE processing, demodulation, metric generation, Viterbi detection and/or decoding, etc. Such information can provide indicia as related to the confidence level associated with a given symbol and/or bit decision, and a relatively lower confidence level may be used to provide indication as to the location of an error in a signal sequence. When using such means (soft information, etc.), a redundant signal sequence may not be needed to identify possible error locations therein. Therefore, soft information, or some other means, may be used to provide indication as to possible error locations within a signal sequence. As mentioned elsewhere herein, as the reader may understand, such soft information may be employed within embodiments employing redundant bit streams for providing even improved confidence in the location(s) of most likely (or potential) bit error locations.

Regardless of the manner by which possible error locations within a signal sequence are identified, these possible error locations are provided for selection of at least one permutation syndrome that corresponds to a CRC check remainder of the signal sequence. If a single possible error location solution is found, then the bits associated with the error locations may be flipped to generate a corrected signal sequence. Alternatively, if more than one possible error location solution is found, then either a CRC failure may be deemed, or one of the multiple solutions may be selected as being the 'correct' solution, and such appropriate bits may be flipped therein.

Figure 7:
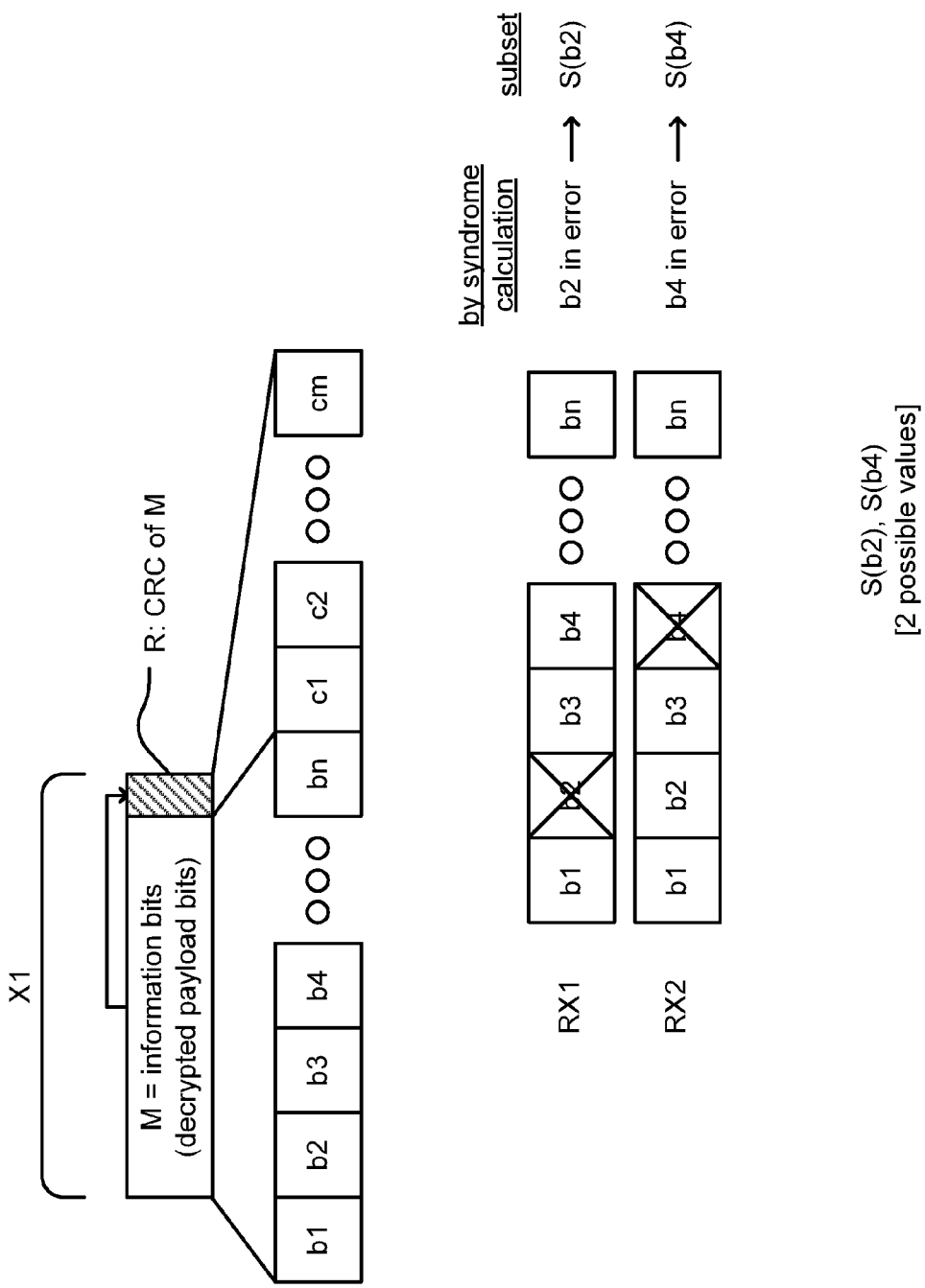
FIG. 7 illustrates an embodiment of one or more possible errors located within redundant signal sequences.

FIG. 7 illustrates an embodiment 700 of one or more possible errors located within redundant signal sequences. As described in several of the embodiments herein, aspects of the error correction approach presented herein operate in accordance with redundant signal sequences (e.g., at least one additional signal sequence that is a redundant transmission, or a retransmission, of another signal sequence). The response by many receiving communication devices to a failed CRC is to request a retransmission of the same data (e.g., to request at least one additional redundant transmission of the previously received signal sequence). Each time that the CRC fails, the receiving communication device may request a retransmission from a sending communication device up to some configurable or predefined limit (e.g., L retransmissions). Hence, if upon the final retransmission, the CRC still fails, the receiving communication device then has L copies of the same data transmitted stream/signal sequence, each of which may have at least one error. The set of copies of the decrypted data payload of the current data frame may be denoted as follows:

$$\{D_R^l(x)\}l=1\ldots L \quad (15)$$

In accordance with the various embodiments of the operations of a mapping circuitry presented herein (and/or within an XOR mapping circuitry), the potential bit-error locations can be obtained by computing the bit-level exclusive-OR (XOR) operation (for L=2) (denoted with "^") on $\{D_R^l(x)\}$ as follows:

$$XORMAP_R(\{D_R^l(x)\})=D_R^1 {}^\wedge D_R^2 \text{ (for } L=2) \quad (16)$$

If the total number of non-zero locations in $XORMAP_R()$ is equal to $K_{XOR}$, then instead of needing to consider $$\binom{K}{P}$$

permutations, then only $2^{K_{XOR}}$ permutations are needed. Hence, only the bit-error locations determined by the non-zero locations of $XORMAP_R()$ are used.

In this embodiment, $XORMAP_R()$ indicates the location of bit-errors among the L streams, but it does not give a definitive indication of the location of bit-errors within each respective stream. For example, if L=2 ($D_R^1$, $D_R^2$) and XOR-$MAP_R()$ is non-zero at bit locations {L1, L2, L3}, then one stream contains one error and the second stream contains two errors. It is not known which bit-error locations occur in each stream.

To correct the bits, one of the streams is selected (e.g., either one may be selected). In the derivation shown below, the first stream is selected. The remainder $R_R^1(x)$ for the first stream is computed. Let $\{L_1, L_2, \ldots, L_{K_{XOR}}\}$ be the non-zero locations of $\text{XORMAP}_R(\ )$. The following is then computed:

$$R_C^k(x) = C_{L_1} \cdot S_{L_1} + C_{L_2} \cdot S_{L_2} + \ldots + C_{L_{KXOR}} \cdot S_{L_{KXOR}} \quad (17)$$

for all k, where $$k=1, C_{L_1}=1, C_{L_2}=0, \ldots, C_{L_{KXOR}}=0$$

$$k=2, C_{L_1}=0, C_{L_2}=1, C_{L_3}=0, \ldots, C_{L_{KXOR}}0$$

$$k=3, C_{L_1}=1, C_{L_2}=1, C_{L_3}0, \ldots, C_{L_{KXOR}}=0 \quad (18)$$

$$k=2^{L_{KXOR}}, C_{L_1}=1, C_{L_2}=1, \ldots, C_{L_{KXOR}}=1.$$

As long as $\text{XORMAP}_R(\ )$ contains the locations of all of the bit-errors, then since all permutations are considered, it is guaranteed that $R_C^k(x) = R_R(x)$ for at least one k. If there is only one k that satisfies the equality, then it corresponds to the solution and the appropriate bits have been flipped. If there are multiple solutions, then one of the solutions is the correct one, and the remaining solutions are false positives corresponding to erroneous solutions when the HD of the CRC has been exceeded. In this case, the system can declare CRC failure, or one of the solutions may be chosen as the correct one. This selection may be based on which solution is most likely according to some decision-making criterion or criteria. For example, the channel error rate of the communication channel from which the signal sequence has been received may be estimated, and the solution that contains the most likely number of non-zero positions may then be selected.

It is noted that various aspects of the error correction technique presented herein are not limited to finding unique solutions that do not violate the HD. When the HD is exceeded, the CRC is not guaranteed to be unique. However, the majority of the bit combinations do produce a unique solution. For these cases, the error detection and concealment approach presented herein identified the unique solution and results in the corrected signal sequence. In addition, even if the CRC is not unique, the permutations considered by the non-zero bit locations of $\text{XORMAP}_R(\ )$ may not include any erroneous solutions. Again, in these cases, the error detection and concealment approach presented herein solves the problem.

While the embodiment described above shows the use of a single redundant stream (e.g., in addition to a first stream), it is noted that the error concealment approach presented herein may be extended to more than one redundant stream (e.g., multiple redundant streams in addition to a first stream) without departing from the scope and spirit of the invention.

Referring again to FIG. 7, the data is shown including n bits (e.g., b1, b2, and so on up to bn), and the CRC is shown as including m bits (e.g., c1, c2, and so on up to cm). This embodiment 700 shows a transmission, RX1, with a redundant transmission, RX2. In actuality, the bit in location b2 of RX1 is in error, and the bit in location b4 of RX2 is in error.

In accordance with the bit error identification operations (e.g., XOR mapping) performed on the first and second received streams, RX1 and RX2, bit errors are identified as being located in bit locations b2 and b4 in the two streams. The bit error identification operations (e.g., XOR mapping) is performed to compare the actual bit streams RX1 and RX2 to see where the location of the errors may be, and the locations correspond to bit locations b2 and b4. However, it is not known which of the errors is in fact located in which of the streams (e.g., whether error with respect to b2 is in RX1 or RX2, or whether error with respect to b4 is in RX1 or RX2).

Of all of the syndromes calculated for each of the respective bit locations of the two received signal streams (which may be pre-calculated or calculated off-line), the bit error identification operations (e.g., XOR mapping) is operative to identify those possible error locations so that only a subset of all possible syndrome permutations corresponding particularly to the errors located within bit locations b2 and b4 in RX1 and RX2 need be considered. To effectuate error correction, one or more permutation syndromes corresponding to errors being located in bit locations b2 and b4 in RX1 and RX2 may then be calculated in real time using pre-computed syndromes associated with single bit errors. As mentioned above with respect to embodiments including a first transmission and one additional transmission (e.g., a singular redundant transmission), one of the streams is selected. If the first stream is selected firstly (e.g., consider RX1), it is considered whether the error is located in each of the bit locations b2 and b4.

When comparing the calculated at least one permutation syndrome of RX1 to the calculated CRC check (e.g., CRC remainder), there will be a match between the calculated permutation syndrome of RX1 and the CRC check reminder corresponding to an error in bit position b2. This will indicate that the error within the RX1 stream is in fact located in bit location b2. Because the bit error location of RX1 is properly identified as being in bit locations b2, then it may be deduced that the bit error location of RX2 is identified as being in bit locations b4.

However, in an alternative embodiment, when processing RX2 initially, when comparing the calculated permutation syndrome to the CRC check reminder, the match will correspond to the calculated permutation syndrome of RX2 and the CRC check reminder corresponding to an error in bit position b4. As such, the error in RX2 may be properly identified in bit locations b4.

In one case, if RX1 is initially selected, the properly identified bit error is located in position b2, and that bit may be flipped to generate a corrected signal sequence. Alternatively, if RX2 is initially selected, the properly identified bit error is located in position b4, and that bit may be flipped to generate the corrected signal sequence.

When a single solution is arrived upon (e.g., a single permutation syndrome), this is a unique and correct solution and a corrected signal sequence may be generated. When more than one solution is arrived upon (e.g., two or more permutation syndromes), one of them may be selected as being the 'solution' using any desired decision means or constraint. Alternatively, when more than one solution is arrived upon (e.g., two or more permutation syndromes), a decoding failure may be declared.

Figure 8:
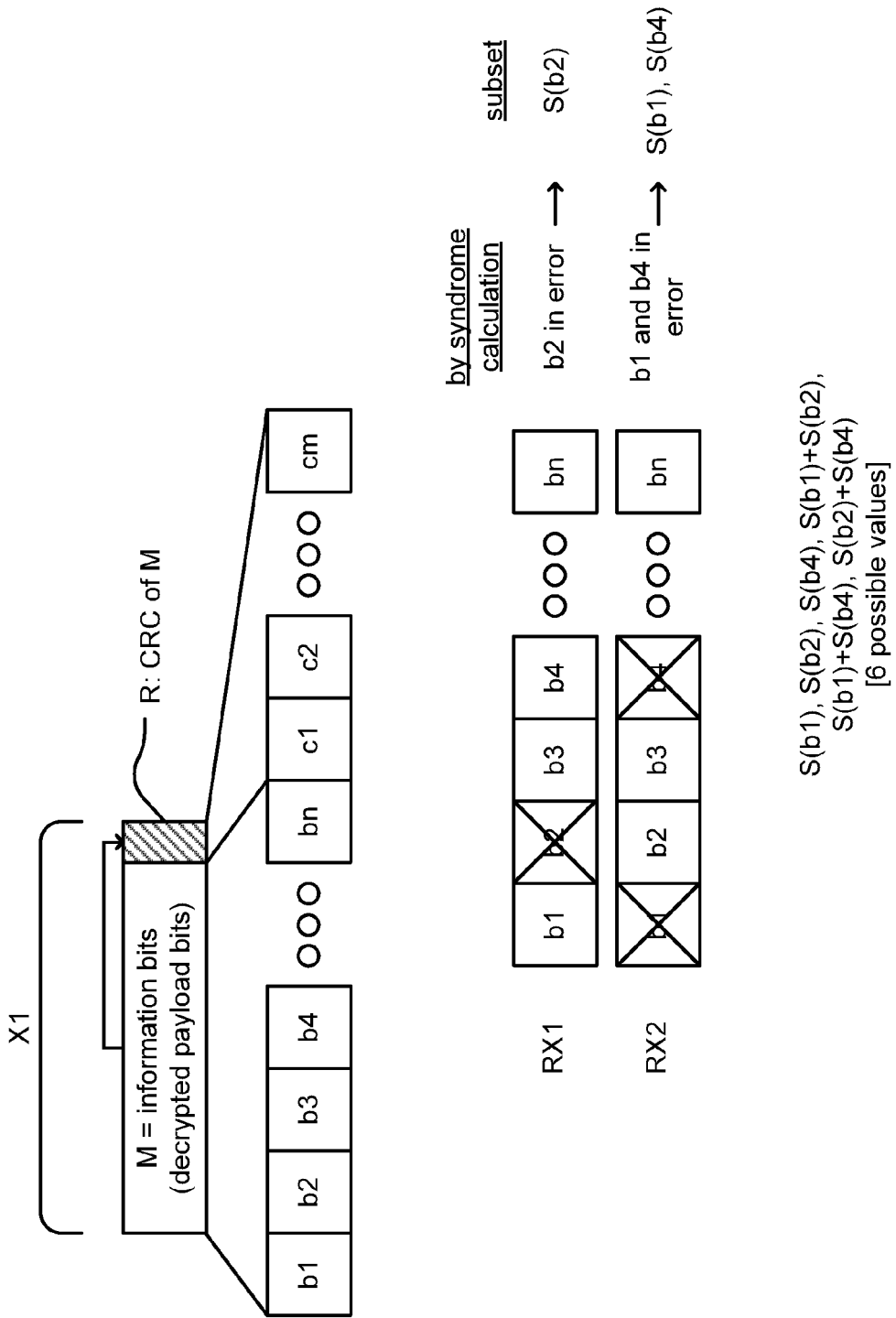
FIG. 8 illustrates an alternative embodiment of one or more possible errors located within redundant signal sequences.

FIG. 8 illustrates an alternative embodiment 800 of one or more possible errors located within redundant signal sequences. This embodiment 800 also shows a transmission, RX1, with another redundant transmission, RX2. However, in this embodiment 700, the bit in location b2 of RX1 is in error, and both the bits in locations b1 and b4 of RX2 are in error.

In accordance with the bit error identification processing (e.g., using XOR processing), possible bit error locations may be calculated for at least one of the respective signal sequences. Bit error identification processing (e.g., using XOR processing) is performed to compare the actual bit streams RX1 and RX2 to see where the location of the errors may be. If the bit values are the same in accordance with the XOR mapping, then the resultant is 0 (e.g., both bits are the same in that respective bit location), or the resultant is 1 (e.g., both bits are the different in that respective bit location).

Thereafter, at least one permutation syndrome is identified that corresponds to the CRC check remainder based on the possible bit error locations. For example, one of the streams is selected. If the first stream is selected (e.g., consider RX1), it is considered whether the error or errors are located in each of the bit locations b1, b2, and/or b4. Unlike the previous embodiment 700 of FIG. 7 (that included only one error in each respective stream RX1 and RX2), because there are three error locations in the embodiment 800 of FIG. 8 (e.g., one error in RX1, and two errors in RX2), there are in fact six possible error scenarios that must be considered. Specifically, three of these possible values correspond to the instance where a stream includes one bit error in each of bit locations b1, b2, or b4, respectively. Also, three of these possible values correspond to the instance where a stream includes two bit errors in each of bit locations "b1 and b2", "b2 and b4", or "b2 and b4".

The combined values corresponding to each of the instances of a stream including two bit errors may be generated by a linear combination of individual bit errors in each of the two respective locations (e.g., bit errors in the two bit locations "b1 and b2" being a linear combination of a bit error in location b1 plus a bit error in location b2, bit errors in the two bit locations "b1 and b4" being a linear combination of a bit error in location b1 plus a bit error in location b4, etc.).

When one of the two streams is initially selected, RX2, and then if the determined permutation syndrome of that stream matches the calculated CRC check remainder that corresponds to errors being located bit positions "b1 and b4", then a unique and correct solution has been found. Again, when a single solution is arrived upon (e.g., a single permutation syndrome), this is a unique and correct solution and a corrected signal sequence may be generated. When more than one solution is arrived upon (e.g., two or more permutation syndromes), one of them may be selected as being the 'solution' using any desired decision means or constraint. Alternatively, when more than one solution is arrived upon (e.g., two or more permutation syndromes), a decoding failure may be declared.

Figure 9:
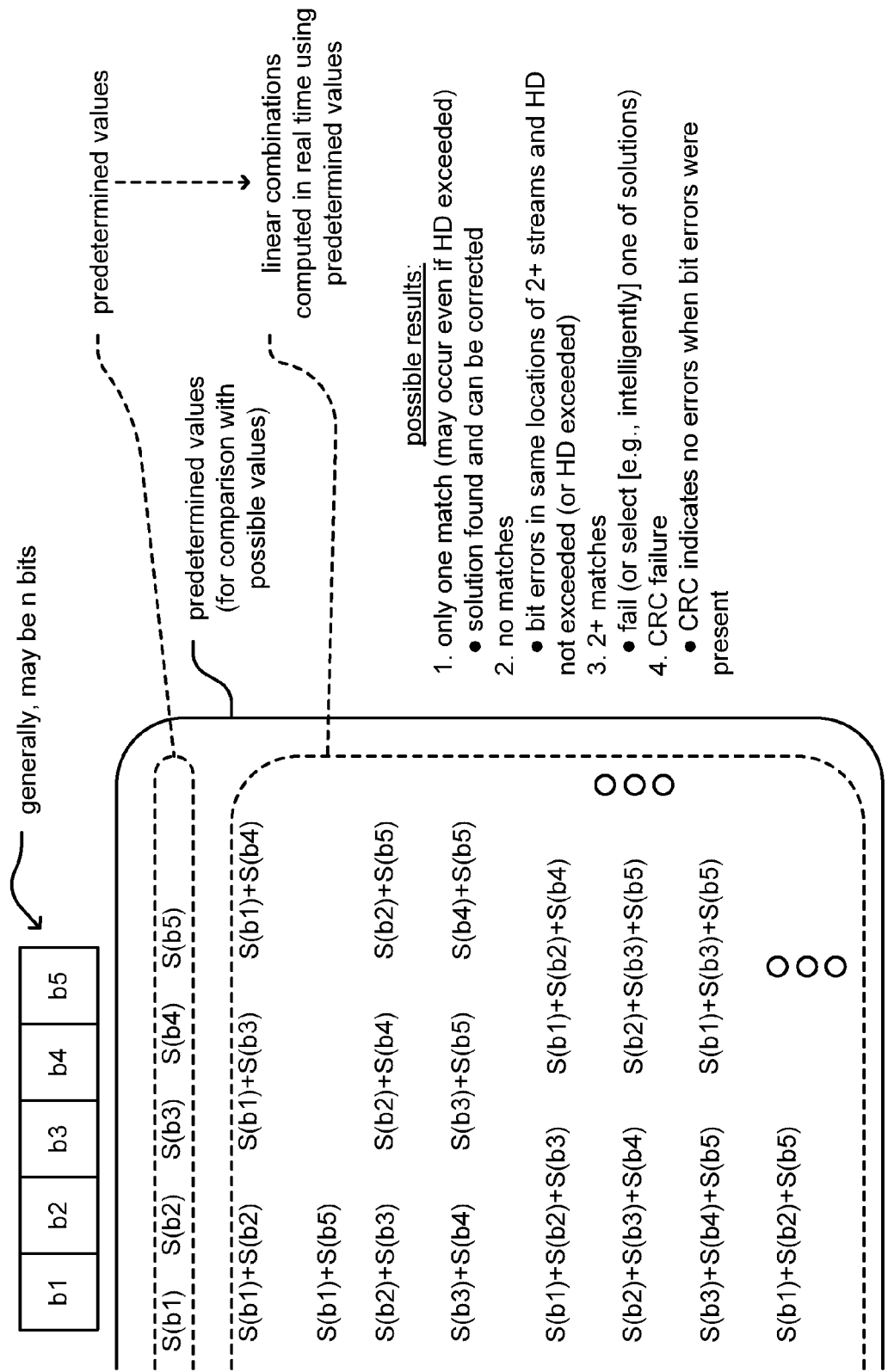
FIG. 9 illustrates an embodiment of possible values that may be calculated to correct for errors located within redundant signal sequences.

FIG. 9 illustrates an embodiment 900 of possible values that may be calculated to correct for errors located within redundant signal sequences. Certain of the previous embodiments relate to situations in which either one or two bit errors may be located in each stream. However, there may be instances where more than two bit errors may occur in each stream. A stream showing 5 bits is depicted in this diagram (e.g., b1, b2, b3, b4, b5). Of course, a stream including more or less than 5 bits may alternatively be employed without departing from the scope and spirit of the invention. This diagram shows the large number of linear combinations of predetermined values that may be needed in a given embodiment (e.g., for use in comparing with the calculated CRC remainder based on the most likely (or potential) error locations within the received signal(s), such as may be determined using XOR processing, soft information, etc.).

Considering the situation for which a singular bit error occurs in a given stream, then predetermined syndromes for each of the respective bit locations within the signal sequence, namely, S(b1), S(b2), and so on may be calculated (e.g., off-line). Considering the situation for which two bit errors occur in a given stream, then certain linear combinations of these predetermined syndromes for each of the combination of two bits, such as S(b1)+S(b2), S(b1)+S(b3), S(b1)+S(b4), and so on, can be calculated. Considering the situation for which three bit errors occur in a given stream, then certain linear combinations of these predetermined syndromes for each of the combination of three bits, such as S(b1)+S(b2)+S(b3), S(b1)+S(b2)+S(b4), S(b2)+S(b3)+S(b4), and so on, can be calculated.

As may be seen, a very large number of permutation syndromes values may need to be calculated in real time using the single bit-error syndromes calculated. While one embodiment envisions that the linear combinations of predetermined syndromes be calculated in real time (e.g., once the most likely (or potential) error locations within the received signal(s) are determined), other embodiments envision that the linear combinations of predetermined syndromes be calculated off-line. That is to say, while such single bit-error syndrome calculations may be performed entirely off-line, any linear combinations thereof typically may be calculated in real time.

As mentioned above, if a singular and unique solution is arrived upon, then the stream may be corrected and the corrected signal sequence may be output. It is again noted that this situation may occur even if the HD of the CRC is exceeded.

However, there may be instances where a singular and unique solution is not arrived upon. For example, there may be instances where no matches are found. In such instances, the bit errors in multiple streams may be in the very same locations of the multiple streams, and the HD of the CRC may not be exceeded. Alternatively, this may be associated with a situation in which the correct bit error locations are not in the search grid (e.g., region across which errors are searched for). Of course, when the HD of the CRC is exceeded, erroneous solutions may be arrived upon.

In other instances, more than two matches may be found when making the comparison between the possible values and the predetermined values (e.g., that may have been calculated before hand). The error correction approach may then either declare that the decoding had failed, or alternatively, select one of the solutions as being the correct solution based on some criterion or criteria.

There may be another situation in which the CRC itself has failed. This failure may occur in rare circumstances when the CRC indicates no bit errors when bit errors are present nevertheless. In this case, the receiver would accept the erroneous transmission or retransmission as valid and the chase coding would not be implemented.

It is noted that terminologies used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An apparatus, comprising:
a receiver for receiving a plurality of encrypted packets having common payload data, wherein each of the plurality of encrypted packets includes a corresponding parity check field, wherein a corresponding parity check syndrome for each of the plurality of encrypted packets indicates at least one bit error;
a processing circuit coupled to the receiver to:
decrypt a payload portion of each of the plurality of encrypted packets to generate a plurality of decrypted payload portions; and
apply at least one chase coding technique to generate a corrected decrypted payload, based on a plurality of candidate bit error positions and further based on the corresponding parity check syndrome for at least one of the plurality of encrypted packets.

2. The apparatus of claim 1 wherein the processing circuit is further operable to:
compare the plurality of decrypted payload portions to generate the plurality of candidate bit error positions in the plurality of decrypted payload portions.

3. The apparatus of claim 1 wherein the plurality of candidate bit error positions is generated based on symbol reliability data.

4. The apparatus of claim 1 wherein the at least one chase coding technique includes:
calculating a parity check syndrome corresponding to each of the plurality of candidate bit error positions;
comparing the parity check syndrome corresponding to the plurality of candidate bit error positions to selected ones of the corresponding parity check syndrome for each of the plurality of encrypted packets; and selectively correcting a selected one of the plurality of decrypted payload portions when the parity check syndrome for one of the plurality of encrypted packets matches the parity check syndrome corresponding to one of the plurality of candidate bit error positions.

5. The apparatus of claim 4 wherein the processing circuit is further operable to:

indicate an uncorrectable error condition when none the parity check syndromes for the plurality of encrypted packets matches the parity check syndrome corresponding to any of the plurality of candidate bit error positions.

6. The apparatus of claim 1 wherein the plurality of encrypted packets include an original transmission and at least one retransmission and the at least one chase coding technique includes a plurality of chase coding techniques.

7. The apparatus of claim 6 wherein the plurality of chase coding techniques includes a chase coding technique that generates the at least one candidate bit error position based on a comparison of two of the plurality of decrypted payload portions.

8. The apparatus of claim 6 wherein the plurality of chase coding techniques includes a chase coding technique that generates the at least one candidate bit error position based on a comparison of at least three of the plurality of decrypted payload portions.

9. An apparatus, comprising:

a receiver for receiving a plurality of encrypted packets having common payload data, wherein each of the plurality of encrypted packets includes a corresponding parity check field, wherein a corresponding parity check syndrome for each of the plurality of encrypted packets indicates at least one bit error;

a processing circuit coupled to the receiver to:

decrypt a payload portion of each of the plurality of encrypted packets to generate a plurality of decrypted payload portions; and apply at least one chase coding technique to generate a corrected decrypted payload, based on at least one candidate bit error position and further based on the corresponding parity check syndrome for at least one of the plurality of encrypted packets.

10. The apparatus of claim 9 wherein the processing circuit is further operable to:

compare the plurality of decrypted payload portions to generate the at least one candidate bit error position in the plurality of decrypted payload portions.

11. The apparatus of claim 9 wherein the at least one candidate bit error position is generated based on symbol reliability data.

12. The apparatus of claim 9 wherein the at least one chase coding technique includes:

calculating a parity check syndrome corresponding to each of the at least one candidate bit error position;

comparing the parity check syndrome corresponding to the at least one candidate bit error position to selected ones of the corresponding parity check syndrome for each of the plurality of encrypted packets; and selectively correcting a selected one of the plurality of decrypted payload portions the parity check syndrome for one of the plurality of encrypted packets matches the parity check syndrome corresponding to the at least one candidate bit error position.

13. The apparatus of claim 12 wherein the processing circuit is further operable to:

indicate an uncorrectable error condition when none the parity check syndromes for the plurality of encrypted packets matches the parity check syndrome corresponding to the at least one candidate bit error position.

14. The apparatus of claim 9 wherein the plurality of encrypted packets include an original transmission and at least one retransmission and the at least one chase coding technique includes a plurality of chase coding techniques.

15. The apparatus of claim 14 wherein the plurality of chase coding techniques includes a chase coding technique that generates the at least one candidate bit error position based on a comparison of two of the plurality of decrypted payload portions.

16. The apparatus of claim 14 wherein the plurality of chase coding techniques includes a chase coding technique that generates the at least one candidate bit error position based on a comparison of at least three of the plurality of decrypted payload portions.

17. A method, comprising:

receiving a plurality of encrypted packets having common payload data, wherein each of the plurality of encrypted packets includes a corresponding parity check field, wherein a corresponding parity check syndrome for each of the plurality of encrypted packets indicates at least one bit error;

decrypting a payload portion of each of the plurality of encrypted packets to generate a plurality of decrypted payload portions; and applying at least one chase coding technique to generate a corrected decrypted payload, based on at least one candidate bit error position in the plurality of decrypted payload portions and further based on the corresponding parity check syndrome for at least one of the plurality of encrypted packets.

18. The method of claim 17 wherein the at least one chase coding technique includes:

calculating a parity check syndrome corresponding to each of the at least one candidate bit error position;

comparing the parity check syndrome corresponding to the at least one candidate bit error position to selected ones of the corresponding parity check syndrome for each of the plurality of encrypted packets; and selectively correcting a selected one of the plurality of decrypted payload portions the parity check syndromes for one of the plurality of encrypted packets matches the parity check syndrome corresponding to the at least one candidate bit error position.

19. The method of claim 17 wherein the at least one chase coding technique includes a chase coding technique that generates the at least one candidate bit error position based on a comparison of two of the plurality of decrypted payload portions.

20. The method of claim 17 wherein the at least one chase coding technique includes a chase coding technique that generates the at least one candidate bit error position based on a comparison of at least three of the plurality of decrypted payload portions.

* * * * *